D. McN. WALLACE.
MACHINE FOR DISTRIBUTING ARTIFICIAL MANURE UPON THE SOIL.
APPLICATION FILED FEB. 12, 1916.
1,198,796.
Patented Sept. 19, 1916.
3 SHEETS—SHEET 3.
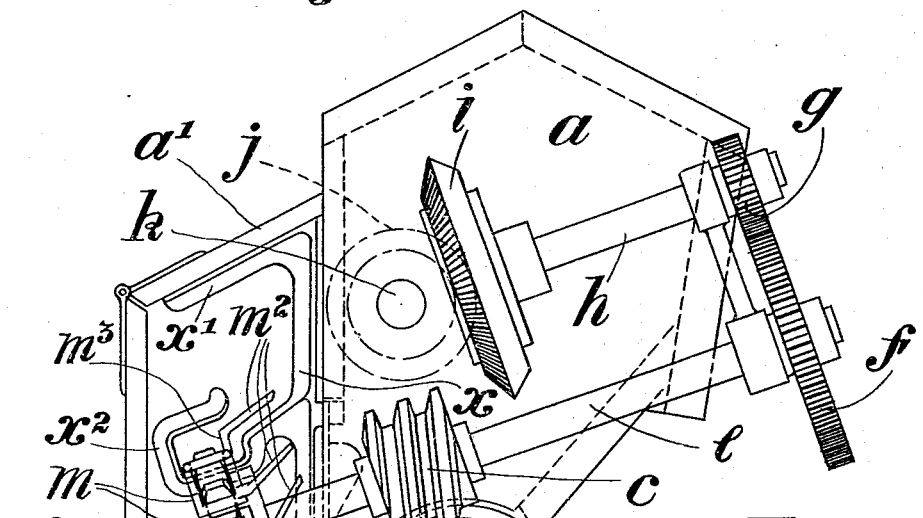
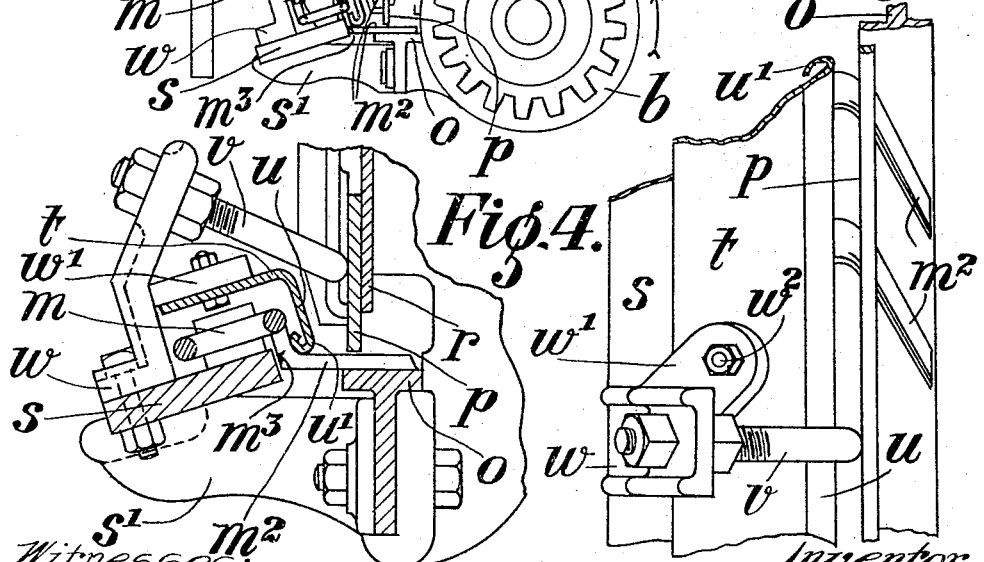

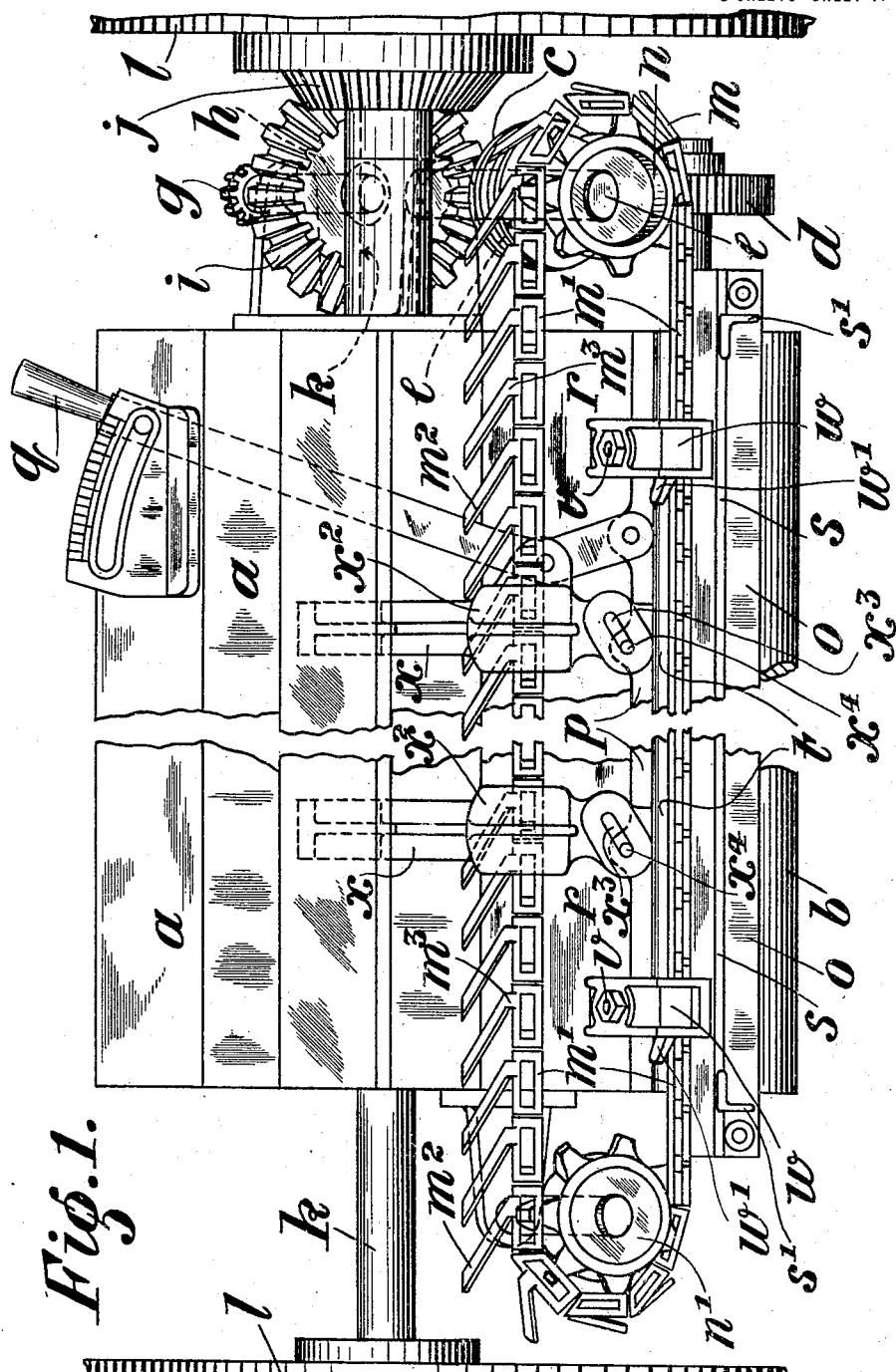

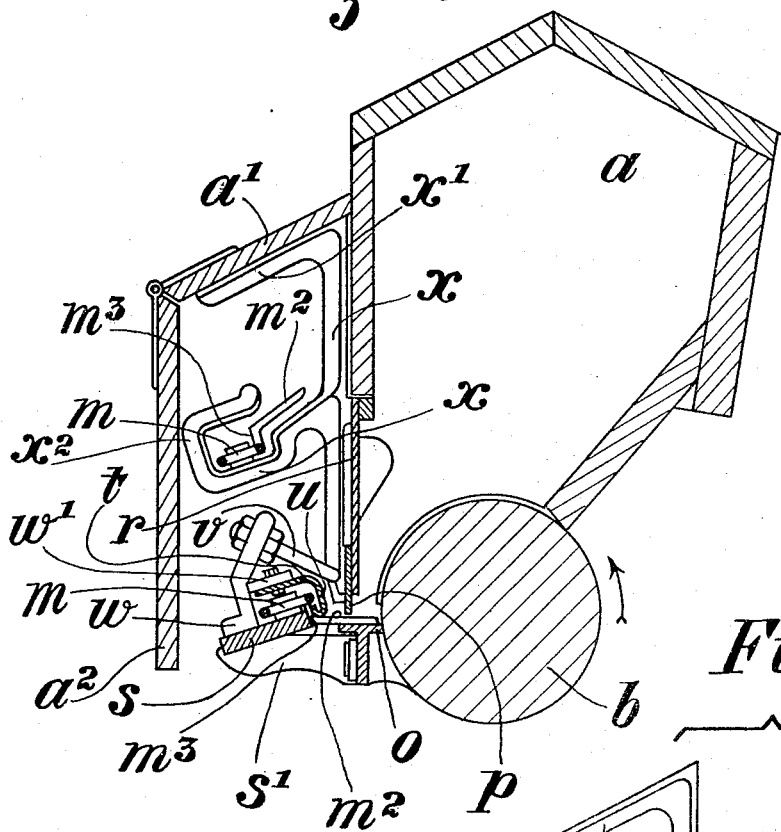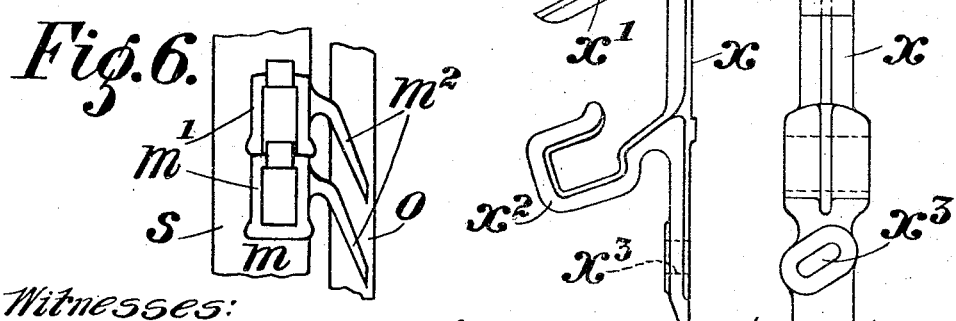

UNITED STATES PATENT OFFICE.

DUNCAN McNAUGHTON WALLACE, OF GLASGOW, SCOTLAND.

MACHINE FOR DISTRIBUTING ARTIFICIAL MANURE UPON THE SOIL.

1,198,796.

Specification of Letters Patent.   Patented Sept. 19, 1916.

Application filed February 12, 1916.   Serial No. 78,051.

*To all whom it may concern:*

Be it known that I, DUNCAN MCNAUGHTON WALLACE, a subject of the King of Great Britain, residing at Glasgow, Scotland, have invented a certain new and useful Machine for Distributing Artificial Manure Upon the Soil, of which the following is a specification.

This application relates to a machine the purpose of which is the distribution of artificial manure upon the soil.

The machine is of the endless chain type. In this type of machine the manure is distributed by a series of inclined prongs or fingers on the endless chain links, these fingers working along a shelf to which the manure is automatically fed.

In the machine, constituting the present invention, the manure from the distributing hopper is fed by means of a rotating drum, which practically forms the bottom of the hopper, to a narrow ledge or shelf along which the distributing fingers of the endless chain move, these fingers simply serving to dislodge the manure from the shelf upon which it has been deposited by the drum instead of, as usual, plowing into the manure within the hopper and kneading it into a paste when being dragged out by the fingers. It is found that the manure frequently contains foreign substances, such as stones or the like, which are apt to cause trouble and to bend back or elongate the fingers and, to overcome this difficulty, I provide a special guard for the chain which retains it in alinement as it works from side to side of the machine and also holds down and retains the fingers in place. In order to retain the gate or regulator plate in position and prevent it being burst outward, when the chain fingers come against obstructions, I provide supporting pins capable of adjustment and carried in brackets suitably mounted on the machine.

In order that the invention may be clearly understood I have hereunto appended explanatory drawings whereon:—

Figure 1 is a back view of the machine with the center part broken away and also the road wheels partially broken away. Fig. 2 is a vertical section of the hopper of the machine and showing the mechanism for delivering the manure. Fig. 3 is a partial side view of the machine showing the hopper and the mechanism for operating the endless chain and also rotating the feed drum. Fig. 4 is an enlarged detail sectional view showing the endless chain arrangement. Fig. 5 is a corresponding plan view. Fig. 6 is a plan view showing part of the chain $m$ with its prongs and part of the shelf $o$. Fig. 7 shows one of the brackets $x$ in side elevation and front elevation.

The back board $a^2$ of the machine, shown in Figs. 2 and 3, is omitted at Fig. 1 so that the chain $m$ and its accessories can be more clearly seen.

Only such parts of the machine are shown as are necessary to the clear explanation of the invention.

The machine comprises the usual hopper $a$ having, at the bottom thereof, a feed drum $b$ which is rotated by the worm gear $c$, $d$, from the shaft $e$ which latter is driven by the spur wheels $f$, $g$, from the shaft $h$ which latter, in its turn, is driven by bevel gear $i$, $j$, from a shaft $k$, operated from one of the road wheels $l$ of the machine. The endless chain $m$ which has links $m^1$ with forwardly projecting fingers $m^2$, runs over sprocket wheels $n$, $n^1$, the wheel $n$ being driven by the shaft $e$ and, as the chain travels, its forwardly projecting fingers $m^2$ move along the ledge or shelf $o$ which is immediately in rear of the drum $b$. Above the ledge $o$ is a gate $p$ which can be adjusted vertically by means of a lever $q$, the adjustment being effected by the action of pins $x^4$ on the gate and which engage upwardly inclined slots $o$ made in brackets $x$. There is also the usual reciprocating plate $r$ which is caused to move from side to side during the operation of the machine thereby preventing the "bridging" or piling up of the manure. As will be seen the lower part of the chain $m$ slides along an inclined and supporting guide bar $s$ mounted, on brackets $s^1$, at the rear of the machine and the fingers $m^2$ which are cranked at $m^3$, bear against the front edge of the bar and are supported thereby. Arranged above and parallel with the bar $s$ is a long guide plate $t$ having a downwardly projecting flange $u$ which, at its underside, is curved or bent to channel form as shown at $u^1$ (Figs. 4 and 5) so as to bear against the front side of the fingers at their cranked part. It will therefore be seen that the cranked parts of the fingers move along a narrow slot left between the bent flange aforesaid and the edge of the bar s and, consequently, are so held that they cannot be readily bent up or buckled when meeting with a hard obstruction.

There are a number of pins $v$ arranged to bear against and support the gate or regulator plate $p$, these pins being carried in brackets $w$ secured to the bar $s$. Each bracket $w$ has a lug $w^1$ to which the plate $t$ is secured by means of screws $w^2$, one of which is shown at Fig. 5.

The endless chain $m$, on its upper side, is supported at intervals by means of the brackets $x$, one of which is shown at Fig. 7. Each bracket $x$, which is firmly secured to the back of the hopper of the machine, has a depending upper part $x^1$ which serve to support the inclined back board $a^1$ and the board $a^2$ hinged thereto, and also a tongue like extension $x^2$ which embraces the chain, as clearly shown at Fig. 3.

With this machine the drum $b$ rotates slowly in the direction of the arrow (Fig. 3) and deposits the manure on to the shelf $o$, the forwardly projecting fingers $m^2$ of the chain $m$ traveling slowly from left to right along the shelf $o$ and taking off the manure which falls from the shelf as a continuous steady deposit on the soil. The reciprocating plate $r$, as usual, prevents the "bridging" of the manure while the gate $p$ can be raised and lowered by the regulating handle $q$ to vary the quantity of manure fed to the shelf. The fingers of the endless chain are always supported and held in position between the bar $s$ and the flange $u$ so that they cannot be buckled while the pins $v$ prevent the gate bursting out should a finger catch against a piece of hard foreign substance when in operation.

Having now fully described my invention, what I claim and desire to secure by Letters Patent is:—

1. A machine for distributing artificial manure, comprising, a hopper for the manure with a delivery shelf, means for feeding the manure to said shelf, an endless chain with forwardly projecting fingers adapted to move along said shelf, means for driving the chain and causing the fingers to move along the shelf, and a guide bar in proximity to said shelf and along which the chain moves and against which the chain fingers bear.

2. A machine for distributing artificial manure, comprising, a hopper for the manure with a delivery shelf, means for feeding the manure to said shelf, an endless chain with forwardly projecting fingers adapted to move along said shelf, means for driving the chain and causing the fingers to move along the shelf, a guide bar in proximity to said shelf and along which the chain moves and a plate so positioned with respect to said bar that a guide way is formed for the chain fingers to work along.

3. A machine for distributing artificial manure, comprising, a hopper for the manure with a delivery shelf, means for feeding the manure to said shelf, a gate above the delivery shelf, an endless chain with forwardly projecting fingers adapted to move along said shelf, means for driving the chain and causing the fingers to move along the shelf, a bar in proximity to the shelf and against which the chain fingers bear, brackets, a plate carried by the brackets and having a flange bearing against the chain fingers, pins projecting from the brackets and bearing against the gate, and means whereby the gate can be moved to regulate the quantity of manure distributed.

4. A machine for distributing artificial manure, comprising, a hopper for the manure with a delivery shelf, means for feeding the manure to said shelf, an endless chain with forwardly projecting fingers adapted to move along said shelf, means for driving the chain and its fingers, means for guiding the chain fingers along the shelf, and brackets carried by the hopper and having extensions embracing and supporting the chain.

5. A machine for distributing artificial manure, comprising, a hopper for the manure with a delivery shelf, means for feeding the manure to said shelf, an endless chain with forwardly projecting fingers adapted to move along said shelf, means for driving the chain and its fingers, means for guiding the chain fingers along the shelf, brackets carried by the hopper and having extensions embracing and supporting the chain, a gate movably carried by the brackets and located above the shelf to form the hopper outlet, and means whereby the gate can be moved to regulate the quantity of manure distributed.

6. A machine for distributing artificial manure, comprising, a hopper for the manure with a delivery shelf, means for feeding the manure to the shelf, means for operating the feeding means, an endless chain with forwardly projecting fingers, means for operating the chain and causing the fingers to move along the shelf, and means retaining the chain in alinement and guiding the fingers so that they will not buckle when working.

7. A machine for distributing artificial manure, comprising, a hopper for the manure with a delivery shelf, means for feeding the manure to the shelf, means for operating the feeding means, an endless chain with forwardly inclined and downwardly bent fingers, means for operating the chain and causing the fingers to move along the shelf, and means retaining the chain in alinement and guiding the fingers so that they will not buckle when working.

8. A machine for distributing artificial manure, comprising, a hopper for the manure with a delivery shelf, means for feeding the manure to the shelf, means for operating the feeding means, an endless chain with forwardly inclined and cranked fingers, means for operating the chain and causing the fingers to move along the shelf, and means retaining the chain in alinement and guiding the fingers so that they will not buckle when working.

9. A machine for distributing artificial manure, comprising, a hopper for the manure with a delivery shelf, a drum for the hopper, an endless chain with forwardly projecting fingers adapted to move along the delivery shelf, means for rotating the drum and for operating the chain, a bar in proximity to the shelf and against which the chain fingers at one side bear, brackets on the bar, a plate carried by the brackets and having a projecting flange bearing against the chain fingers at the opposite side, brackets on the hopper embracing and supporting the chain and brackets on the machine supporting the said bar.

10. A machine for distributing artificial manure, comprising, a hopper for the manure with a delivery shelf, a drum for the hopper, an endless chain with forwardly projecting fingers adapted to move along the delivery shelf, means for rotating the drum and for operating the chain, a bar in proximity to the shelf and against which the chain fingers at one side bear, brackets on the bar, a plate carried by the brackets and having a projecting flange turned over along its edge the turned over part bearing against the chain fingers at the opposite side, brackets on the hopper embracing and supporting the chain and brackets on the machine supporting said bar.

11. A machine for distributing artificial manure, of the character stated, having an endless chain with forwardly projecting fingers, means for driving the chain, and means for guiding the chain fingers so that they will not buckle readily when working.

12. A machine for distributing artificial manure, of the character stated, having an endless chain with forwardly projecting fingers, means for driving the chain, and means retaining the chain in alinement and guiding the fingers so that they will not buckle readily when working.

13. A machine for distributing artificial manure of the character stated, having an endless chain with forwardly projecting and cranked fingers, means for driving the chain, and means for guiding the cranked parts of the chain fingers so that they will not buckle readily when working.

14. A machine for distributing artificial manure, of the character stated, having a hopper with delivery shelf, an endless chain with forwardly projecting fingers at one side thereof and adapted to sweep along said shelf, means for feeding the manure to the shelf, means for driving the chain and causing the fingers to distribute the manure, and means for guiding the chain fingers as they work along the shelf.

15. A machine for distributing artificial manure, of the character stated, having a hopper with delivery shelf, an endless chain with downwardly bent and forwardly projecting fingers at one side thereof and adapted to sweep along said shelf, means for feeding the manure to the shelf, means for driving the chain and causing the fingers to distribute the manure, and means for guiding the chain fingers as they work along the shelf.

16. A machine for distributing artificial manure, comprising, a hopper for the manure with a delivery shelf, means for feeding the manure to said shelf, an endless chain with forwardly projecting fingers adapted to move along said shelf, means for driving the chain and causing the fingers to move along the shelf, and a guide bar in proximity to said shelf and inclined at an angle thereto along which the chain moves and against which the chain fingers bear.

In testimony whereof I affix my signature in presence of two witnesses.

DUNCAN McNAUGHTON WALLACE.

Witnesses:
   WILLIAM GALL,
   MARY GREEN.

Copies of this patent may be obtained for five cents each, by addressing the "Commissioner of Patents, Washington, D. C."